US009802339B2

(12) United States Patent
Medina et al.

(10) Patent No.: US 9,802,339 B2
(45) Date of Patent: Oct. 31, 2017

(54) METHOD FOR MAKING CONTACT LENSES

(71) Applicant: Novartis AG, Basel (CH)

(72) Inventors: Arturo Norberto Medina, Suwanee, GA (US); Jinyu Huang, Suwanee, GA (US); Katherine Ard, Alpharetta, GA (US); Honghui Lu, Johns Creek, GA (US); Uwe Haken, Norcross, GA (US)

(73) Assignee: Novartis AG, Basel (CH)

( * ) Notice: Subject to any disclaimer, the term of this patent is extended or adjusted under 35 U.S.C. 154(b) by 365 days.

(21) Appl. No.: 14/567,401

(22) Filed: Dec. 11, 2014

(65) Prior Publication Data
US 2015/0165653 A1 Jun. 18, 2015

Related U.S. Application Data

(60) Provisional application No. 61/915,856, filed on Dec. 13, 2013.

(51) Int. Cl.
| | |
|---|---|
| *B29D 11/00* | (2006.01) |
| *B29C 39/00* | (2006.01) |
| *B29C 33/64* | (2006.01) |
| *C09D 183/04* | (2006.01) |
| *C08G 77/54* | (2006.01) |
| *C08G 77/26* | (2006.01) |
| *C08G 77/44* | (2006.01) |
| *C08L 83/10* | (2006.01) |
| *B29K 83/00* | (2006.01) |
| *G02B 1/04* | (2006.01) |

(52) U.S. Cl.
CPC ............ *B29C 39/003* (2013.01); *B29C 33/64* (2013.01); *B29D 11/00038* (2013.01); *B29D 11/00192* (2013.01); *B29D 11/00519* (2013.01); *C08G 77/26* (2013.01); *C08G 77/44* (2013.01); *C08G 77/54* (2013.01); *C08L 83/10* (2013.01); *C09D 183/04* (2013.01); *B29K 2083/00* (2013.01); *G02B 1/043* (2013.01)

(58) Field of Classification Search
CPC ........ B29D 11/00038; B29D 11/00192; B29D 11/00519; B29C 39/003; B29C 33/64
See application file for complete search history.

(56) References Cited

U.S. PATENT DOCUMENTS

| 3,732,193 | A | * | 5/1973 | Svarz | C08F 2/10 |
| | | | | | 264/216 |
| 4,136,250 | A | | 1/1979 | Mueller | |
| 4,153,641 | A | | 5/1979 | Deichert | |
| 4,159,292 | A | | 6/1979 | Neefe | |
| 4,182,822 | A | | 1/1980 | Chang | |
| 4,185,087 | A | | 1/1980 | Morlino | |
| 4,189,546 | A | | 2/1980 | Deichert | |
| 4,254,248 | A | | 3/1981 | Friends | |
| 4,259,467 | A | | 3/1981 | Keogh | |
| 4,260,725 | A | | 4/1981 | Keogh | |
| 4,261,875 | A | | 4/1981 | LeBoeuf | |
| 4,276,402 | A | | 6/1981 | Chromecek | |
| 4,327,203 | A | | 4/1982 | Diechert | |
| 4,341,889 | A | | 7/1982 | Diechert | |
| 4,343,927 | A | | 8/1982 | Chang | |
| 4,355,147 | A | | 10/1982 | Diechert | |
| 4,444,711 | A | | 4/1984 | Schad | |
| 4,460,534 | A | | 7/1984 | Boehm | |
| 4,486,577 | A | | 12/1984 | Mueller | |
| 4,534,916 | A | | 8/1985 | Wichterle | |
| 4,543,398 | A | | 9/1985 | Bany | |
| 4,605,712 | A | | 8/1986 | Mueller | |
| 4,661,575 | A | | 4/1987 | Tom | |
| 4,684,538 | A | | 8/1987 | Klemarczyk | |
| 4,703,097 | A | | 10/1987 | Wingler | |
| 4,833,218 | A | | 5/1989 | Lee | |
| 4,837,289 | A | | 6/1989 | Mueller | |
| 4,929,707 | A | | 5/1990 | Nagata | |
| 4,946,923 | A | | 8/1990 | Nagata | |
| 4,954,586 | A | | 9/1990 | Toyoshima | |
| 4,954,587 | A | | 9/1990 | Mueller | |
| 5,010,141 | A | | 4/1991 | Mueller | |
| 5,013,496 | A | | 5/1991 | Nagata | |
| 5,021,503 | A | | 6/1991 | Nagata | |
| 5,034,461 | A | | 7/1991 | Lai | |

(Continued)

FOREIGN PATENT DOCUMENTS

| DE | 155394 A1 | 6/1982 |
| EP | 0367513 B1 | 7/1995 |

(Continued)

OTHER PUBLICATIONS

PCT International Search Report dated Feb. 3, 2015, International Application No. PCT/US2014/063027, International Filing Date Oct. 30, 2014.
PCT Written Opinion of the International Searching Authority dated Feb. 3, 2015, International Application No. PCT/US2014/063027, International Filing Date Oct. 30, 2014.
Authors: Eduardo F. Marques, Oren Regev, Ali Khan, Maria Da Graca Miguel, and Björn Lindman Title: Vesicle Formation and General Phase Behavior in the Catanionic Mixture SDS-DDAB-Water. The Anionic-Rich Side Published: J. Phys. Chem. B, 1998, vol. 102, pp. 6746-6758.
Authors: Srinivasa R. Raghavan, Gerhard Fritz, and Eric W. Kaler Title: Wormlike Micelles Formed by Synergistic Self-Assembly in Mixtures of Anionic and Cationic Surfactants Published: Langmuir 2002, vol. 18, pp. 3797-3803.
Authors: Sara B. Lioi, Xiang Wang, Mohammad R. Islam, Emily J. Danoff and Douglas S. English Title: Catanionic surfactant vesicles for electrostatic molecular sequestration and separation Published: Physical Chemistry Chemical Physics, 2009, vol. 11, pp. 9315-9325.

(Continued)

*Primary Examiner* — Mathieu Vargot
(74) *Attorney, Agent, or Firm* — Sheng-Hsin Hu

(57) ABSTRACT

The instant invention pertains to a method and a fluid composition for producing contact lenses with improved lens quality and with increased product yield. The method of the invention involves applying to a molding surface of the mold a layer of mold releasing agent selected from a group consisting of fatty amines of carbon chain length C18 or less and silicones bearing pendant substituted pyrrolidone groups solution to reduce an averaged mold separation force by at least about 50% in comparison with that without the releasing agent.

18 Claims, No Drawings

(56) References Cited

U.S. PATENT DOCUMENTS

| | | |
|---|---|---|
| 5,039,761 A | 8/1991 | Ono |
| 5,070,170 A | 12/1991 | Robertson |
| 5,079,319 A | 1/1992 | Mueller |
| 5,126,388 A | 6/1992 | Nagata |
| 5,165,994 A | 11/1992 | Kaler |
| 5,264,161 A | 11/1993 | Druskis |
| 5,346,946 A | 9/1994 | Yokoyama |
| 5,358,995 A | 10/1994 | Lai |
| 5,387,632 A | 2/1995 | Lai |
| 5,416,132 A | 5/1995 | Yokoyama |
| 5,451,617 A | 9/1995 | Lai |
| 5,486,579 A | 1/1996 | Lai |
| 5,508,317 A | 4/1996 | Müller |
| 5,527,925 A | 6/1996 | Chabrecek |
| 5,542,978 A | 8/1996 | Kindt-Larsen |
| 5,583,163 A | 12/1996 | Müller |
| 5,594,088 A | 1/1997 | Nagata |
| 5,612,389 A | 3/1997 | Chabrecek |
| 5,612,391 A | 3/1997 | Chabrecek |
| 5,621,018 A | 4/1997 | Chabrecek |
| 5,665,840 A | 9/1997 | Pöhlmann |
| 5,712,356 A | 1/1998 | Bothe |
| 5,753,730 A | 5/1998 | Nagata |
| 5,760,100 A | 6/1998 | Nicolson |
| 5,789,464 A | 8/1998 | Müller |
| 5,843,346 A | 12/1998 | Morrill |
| 5,849,810 A | 12/1998 | Müller |
| 5,849,811 A | 12/1998 | Nicolson |
| 5,849,841 A | 12/1998 | Mühlebach |
| 5,894,002 A | 4/1999 | Boneberger |
| 5,936,052 A | 8/1999 | Bothe |
| 5,962,548 A | 10/1999 | Vanderlaan |
| 5,981,675 A | 11/1999 | Valint, Jr. |
| 6,039,913 A | 3/2000 | Hirt |
| 6,165,408 A | 12/2000 | Steinmann |
| 6,203,909 B1 | 3/2001 | Chassot |
| 6,221,303 B1 | 4/2001 | Steinmann |
| 6,303,687 B1 | 10/2001 | Müller |
| 6,342,570 B1 | 1/2002 | Bothe |
| 6,367,929 B1 | 4/2002 | Maiden |
| 6,451,871 B1 | 9/2002 | Winterton |
| 6,472,489 B1 | 10/2002 | Stockinger |
| 6,479,587 B1 | 11/2002 | Stockinger |
| 6,492,478 B1 | 12/2002 | Steinmann |
| 6,627,124 B1 | 9/2003 | Herbrechtsmeier |
| 6,719,929 B2 | 4/2004 | Winterton |
| 6,762,264 B2 | 7/2004 | Künzler |
| 6,793,973 B2 | 9/2004 | Winterton |
| 6,800,225 B1 | 10/2004 | Hagmann |
| 6,811,805 B2 | 11/2004 | Gilliard |
| 6,822,016 B2 | 11/2004 | McCabe |
| 6,849,210 B2 | 2/2005 | Bothe |
| 6,896,926 B2 | 5/2005 | Qiu |
| 7,091,283 B2 | 8/2006 | Müller |
| 7,238,750 B2 | 7/2007 | Müller |
| 7,268,189 B2 | 9/2007 | Müller |
| 7,384,590 B2 | 6/2008 | Kelly |
| 7,387,759 B2 | 6/2008 | Kelly |
| 7,521,519 B1 | 4/2009 | Hirt |
| 7,605,190 B2 | 10/2009 | Moszner |
| 7,858,000 B2 | 12/2010 | Winterton |
| 7,977,430 B2 | 7/2011 | Devlin |
| 8,147,897 B2 | 4/2012 | Ferreiro |
| 8,163,206 B2 | 4/2012 | Chang |
| 8,409,599 B2 | 4/2013 | Wu |
| 8,440,735 B2 | 5/2013 | Pruitt |
| 8,557,940 B2 | 10/2013 | Chang |
| 8,993,651 B2 | 3/2015 | Chang |
| 2004/0082680 A1 | 4/2004 | Phelan |
| 2007/0244211 A1 | 10/2007 | Phelan |
| 2008/0015315 A1 | 1/2008 | Chang |
| 2008/0143003 A1 | 6/2008 | Phelan |
| 2008/0143958 A1 | 6/2008 | Medina |
| 2008/0152800 A1 | 6/2008 | Bothe |
| 2008/0231798 A1 | 9/2008 | Zhou |
| 2008/0234457 A1 | 9/2008 | Zhou |
| 2011/0134387 A1 | 6/2011 | Samuel |
| 2012/0026457 A1 | 2/2012 | Qiu |
| 2012/0088843 A1 | 4/2012 | Chang |
| 2012/0088844 A1 | 4/2012 | Kuyu |
| 2012/0088861 A1 | 4/2012 | Huang |
| 2012/0139138 A1* | 6/2012 | Samuel ............ B29D 11/00153 264/1.36 |
| 2013/0118127 A1 | 5/2013 | Kolluru |
| 2014/0171539 A1 | 6/2014 | Chang |
| 2014/0171542 A1 | 6/2014 | Chang |
| 2014/0171543 A1 | 6/2014 | Chang |
| 2015/0092155 A1 | 4/2015 | Chang |

FOREIGN PATENT DOCUMENTS

| | | |
|---|---|---|
| EP | 0958315 B1 | 6/2001 |
| EP | 0932635 B1 | 7/2001 |
| EP | 0961941 B1 | 4/2002 |
| WO | 87/04390 A1 | 7/1987 |
| WO | 00/31150 A1 | 6/2000 |
| WO | 03/095171 A1 | 11/2003 |
| WO | 2012078457 A1 | 6/2012 |

OTHER PUBLICATIONS

PCT International Search Report dated Mar. 3, 2015, International Application No. PCT/US2014/069752 International Filing Date Dec. 11, 2014.

PCT Written Opinion of the International Searching Authority dated Mar. 3, 2015, International Application No. PCT/US2014/069752, International Filing Date Dec. 11, 2014.

* cited by examiner

METHOD FOR MAKING CONTACT LENSES

This application claims the benefit under 35 USC §119 (e) of U.S. provisional application No. 61/915,856 filed 13 Dec. 2013, incorporated by reference in its entirety.

The present invention is related to a method for making contact lenses. In particular, the present invention is related to a method for facilitating mold separation and lens removal from a mold in a cast-molding process of contact lenses using fatty amines of carbon chain length C18 or less; silicones bearing pendant substituted pyrrolidone groups as mold releasing agents, thereby enhancing the quality and yield of produced contact lenses.

BACKGROUND

Contact lenses can be manufactured economically in a mass production manner by a conventional cast-molding process involving disposable molds (e.g., PCT published patent application No. WO/87/04390, EP-A 0 367 513, U.S. Pat. No. 5,894,002, all of which are herein incorporated by reference in their entireties) or by an improved cast-molding process involving reusable molds and curing under a spatial limitation of actinic radiation (U.S. Pat. Nos. 5,508,317, 5,583,163, 5,789,464 and 5,849,810). A critical step in the production of lenses using molds is mold opening and lens releasing from the mold without damaging the lens. Subsequent to the completion of the contact lens molding process, the polymerized lens tends to strongly adhere to the mold. During mold opening and removing the contact lenses from the mold, cracks, flaws and/or tears may occur in the lenses or in the worst case the contact lenses even break totally. Contact lenses having such defects have to be discarded and lower the overall production yield.

Several methods have been developed or proposed. One method for releasing lenses is to hydrate the lens, namely, a lens-in-mold assembly after mold separation is placed in a hydration tank filled with water. Often hydration alone does not release the lenses from the molds. The lenses must then be gently removed from molds by hand. Such hand-assisted lens removal increases the likelihood of lens damage. U.S. Pat. No. 5,264,161 discloses an improved method for releasing a lens from a mold, in which surfactants are added to the hydration bath to facilitate the release of lenses from molds. However, the utilization of surfactants in a hydration bath does not provide a more effortless mold separation. Lens damage incurred during mold separation may not be minimized by hydrating lenses.

Another method of lens release is to incorporate surfactants as internal mold releasing agents into molds themselves as illustrated by U.S. Pat. No. 4,159,292. Incorporation of internal mold releasing agents in molds can decrease adhesion between lenses and molds. However, when a mold is used repeatedly, surfactants as internal mold releasing agent can be exhausted by exudation.

A further method of lens release is to apply external mold releasing agents (e.g., surfactants) in the form of a film or coating onto to the molding surfaces of a mold (e.g., those disclosed in U.S. Pat. Nos. 4,929,707 and 5,542,978). When external mold releasing agents are used, a portion of the agents used for treating the molding surfaces of the mold can migrate to the surface and interior of the polymerized lens.

A still further method of lens release is to incorporate internal mold releasing agents into a lens-forming composition for making contact lenses. The internal mold releasing agent can be a surfactant (U.S. Pat. Nos. 4,534,916; 4,929,707; 4,946,923; 5,013,496; 5,021,503; 5,126,388; 5,594,088; 5,753,730) or a non-polymerizable polymer (U.S. Pat. No. 6,849,210). By incorporation of an internal mold releasing agent in a lens-forming composition (or lens formulation), the adhesion between molds and lenses may be reduced, a relatively smaller force may be required to separate mold, and lenses may be removed from molds with less effort. A portion of the internal mold releasing agent need migrate to the surface of the polymerized lens in order to be effective to reduce the adhesion between molds and lenses. A great effort has been made to develop technologies for cast molding of hydrogel contact lenses with high precision, fidelity and reproducibility and at low cost. One of such manufacturing technologies is the so-called Lightstream Technology™ (Alcon) involving a lens-forming composition being substantially free of monomers and comprising a substantially purified prepolymer with ethylenically-unsaturated groups, reusable molds, and curing under a spatial limitation of actinic radiation (e.g., UV), as described in U.S. Pat. Nos. 5,508,317, 5,583,463, 5,789,464, and 5,849,810.

However, there are some practical limitations which hinder realization of all of the great potentials of such technology in the production of silicone hydrogel contact lenses. For example, when a silicone-containing prepolymer disclosed in commonly-owned U.S. Pat. Nos. 7,091,283, 7,268,189 and 7,238,750 is used to prepare a silicone hydrogel lens formulation, an organic solvent is generally required to solubilize the prepolymer. When such lens formulation is used to produce silicone hydrogel according to the Lightstream Technology™, the cured lens in the mold after UV crosslinking is still swollen in the organic solvent before the solvent exchange to water. Such lens may not be able to survive the mold opening and de-molding process, because the cured lens is in the swollen state in the organic solvent and has an inadequate stiffness and toughness (e.g., too low). As such, the production yield may be low and the production cost could be higher due to low production yield derived from the lens defects created during mold opening and de-molding process. However, conventional release mold agents are not effective to reduce lens defects created during mold opening and de-molding process in manufacturing contact lenses from silicone-containing prepolymers. The defects created during mold separation cab be a big issue in manufacturing contact lenses with silicone-containing prepolymer according to the Lightstream Technology™.

Therefore, there is a need for a method for using a new mold releasing agent for molding contact lenses. There is also a need for a method for using a new mold releasing agent for molding silicone hydrogel contact lenses. There is a further need for a process for cast-molding contact lenses with an enhanced quality and enhanced yield achieved by reducing mold separation force and lens-mold adhesion through using a new mold releasing agent for molding silicone-containing prepolymer contact lenses with Lightstream Technology™.

SUMMARY OF THE INVENTION

The invention, in one aspect, provides a method for making contact lenses, comprising the steps of:

(1) providing a contact lens mold, wherein the mold has a first mold half with a first molding surface defining the anterior surface of a contact lens and a second mold half with a second molding surface defining the posterior surface of the ophthalmic lens, wherein said first and second mold halves are configured to receive each other such that a cavity is formed between said first and second molding surfaces;

(2) applying a layer solution of mold releasing agent selected from the group consisting of fatty amines of carbon chain length C18 or less and silicones bearing pendant substituted pyrrolidone groups onto the first molding surface and/or the second molding surface, wherein the weight percentage of mold releasing agent in the solution is from 0.01% to 10% based on the entire weight of the solution;

(3) at least partially drying said layer solution to form a coat of the releasing agent on the first and/or second molding surface, wherein the formation of the coat of the releasing agent vesicles on the first and/or second molding surfaces is characterized by having a percentage of reduction in mold separation force of at least about 50% relative to a control mold without any coat of the releasing agent vesicles thereon, (4) introducing a fluid composition into the cavity formed by the first and second molding surfaces with the coat of the mold releasing agent formed in step (3) thereon, wherein the fluid composition comprises a lens-forming material, wherein the lens-forming material is crosslinkable and/or polymerizable by actinic radiation;

(5) crosslinking/polymerizing the lens-forming material in the mold to form a contact lens having a polymer matrix; and (6) separating the mold and removing the formed contact lens from the mold.

The invention, in another aspect, provides a method for producing a contact lens, comprising: the steps of:

(1) introducing a fluid composition into a mold for making a contact lens, wherein the fluid composition comprises a lens-forming material and a mold releasing agent selected from the group consisting of a fatty amine of carbon chain length C18 or less and silicones bearing pendant substituted pyrrolidone groups, wherein the lens-forming material is crosslinkable and/or polymerizable by actinic radiation or by heating; (2)

crosslinking/polymerizing the lens-forming material in the mold to form a lens having a polymer matrix, wherein at least part of the mold releasing agent migrates to the interface between the mold and the polymer matrix of the formed lens; and (3) separating the mold, wherein the mold releasing agent is present in an amount sufficient to reduce an averaged mold separation force by at least about 50% in comparison with that without the releasing agent.

DETAILED DESCRIPTION OF THE PREFERRED EMBODIMENTS

Reference now will be made in detail to the embodiments of the invention. It will be apparent to those skilled in the art that various modifications and variations can be made in the present invention without departing from the scope or spirit of the invention. For instance, features illustrated or described as part of one embodiment, can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention.

Unless defined otherwise, all technical and scientific terms used herein have the same meaning as commonly understood by one of ordinary skill in the art to which this invention belongs. Generally, the nomenclature used herein and the laboratory procedures are well known and commonly employed in the art. Conventional methods are used for these procedures, such as those provided in the art and various general references. The singular forms "a", "an" and "the" include plural aspects unless the context clearly dictates otherwise. Thus, for example, reference to a mold releasing agent includes a single mold releasing agent, as well as two or more mold releasing agents. The nomenclature used herein and the laboratory procedures described below are those well known and commonly employed in the art. As employed throughout the disclosure, the following terms, unless otherwise indicated, shall be understood to have the following meanings.

"Contact Lens" refers to a structure that can be placed on or within a wearer's eye. A contact lens can correct, improve, or alter a user's eyesight, but that need not be the case. A contact lens can be of any appropriate material known in the art or later developed, and can be a soft lens, a hard lens, or a hybrid lens. A "silicone hydrogel contact lens" refers to a contact lens comprising a silicone hydrogel material.

A "hydrogel" or "hydrogel material" refers to a polymeric material which can absorb at least 10 percent by weight of water when it is fully hydrated.

A "silicone hydrogel" refers to a silicone-containing hydrogel obtained by copolymerization of a polymerizable composition comprising at least one silicone-containing monomer or at least one silicone-containing macromer or at least one crosslinkable silicone-containing prepolymer.

"Hydrophilic," as used herein, describes a material or portion thereof that will more readily associate with water than with lipids.

A "monomer" means a low molecular weight compound that can be polymerized and comprises one or more actinically crosslinkable groups. Low molecular weight typically means average molecular weights less than 700 Daltons.

An "actinically-crosslinkable group" refers to a group which can react with another group of same type or different type to form a covalent linkage upon actinic irradiation. Examples of actinically-crosslinkable groups include without limitation acryl groups, thiol groups, and ene-containing groups. Acryl groups can undergo free-radical chain reaction upon actinic irradiation. Thiol groups (—SH) and ene-containing groups can participate in thiol-ene step-growth radical polymerization as described in a commonly-owned copending U.S. patent application No. 60/869,812 filed Dec. 13, 2006 (entitled "PRODUCTION OF OPHTHALMIC DEVICES BASED ON PHOTO-INDUCED STEP GROWTH POLYMERIZATION"), herein incorporated in reference in its entirety.

An "acryl group" is an organic radical having a formula of

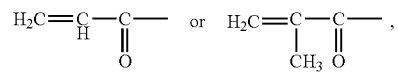

provided the carbonyl is connected to O or N.

An "ene-containing group" is a mono-valent or divalent radical contains a carbon-carbon double which is not directly linked to a carbonyl group (—CO—), nitrogen atom, or oxygen atom and is defined by any one of formula (I)-(III)

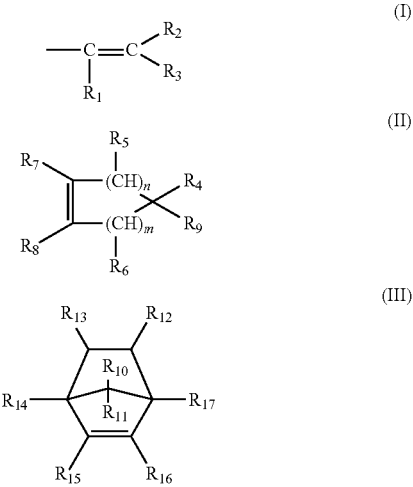

in which $R_1$ is hydrogen, or $C_1$-$C_{10}$ alkyl; $R_2$ and $R_3$ independent of each other are hydrogen, $C_1$-$C_{10}$ alkene divalent radical, $C_1$-$C_{10}$ alkyl, or —$(R_{18})_a$—$(X_1)_b$—$R_{19}$ in which $R_{18}$ is $C_1$-$C_{10}$ alkene divalent radical, $X_1$ is an ether linkage (—O—), a urethane linkage (—N), a urea linkage, an ester linkage, an amid linkage, or carbonyl, $R_{19}$ is hydrogen, a single bond, amino group, carboxylic group, hydroxyl group, carbonyl group, $C_1$-$C_{12}$ aminoalkyl group, $C_1$-$C_{18}$ alkylaminoalkyl group, $C_1$-$C_{18}$ carboxyalkyl group, $C_1$-$C_{18}$ hydroxyalkyl group, $C_1$-$C_{18}$ alkylalkoxy group, $C_1$-$C_{12}$ aminoalkoxy group, $C_1$-$C_{18}$ alkylaminoalkoxy group, $C_1$-$C_{18}$ carboxyalkoxy group, or $C_1$-$C_{18}$ hydroxyalkoxy group, a and b independent of each other is zero or 1, provided that only one of $R_2$ and $R_3$ is a divalent radical; $R_4$-$R_9$, independent of each other, are hydrogen, $C_1$-$C_{10}$ alkene divalent radical, $C_1$-$C_{10}$ alkyl, or —$(R_{18})_a$—$(X_1)_b$—$R_{19}$, provided that only one or two of $R_4$-$R_9$ are divalent radicals; n and m independent of each other are integer number from 0 to 9, provided that the sum of n and m is an integer number from 2 to 9; $R_{10}$-$R_{17}$, independent of each other, are hydrogen, $C_1$-$C_{10}$ alkene divalent radical, $C_1$-$C_{10}$ alkyl, or —$(R_{18})_a$—$(X_1)_b$—$R_{19}$, provided that only one or two of $R_{10}$-$R_{17}$ are divalent radicals.

A "vinylic monomer", as used herein, refers to a monomer that has an ethylenically unsaturated group and can be polymerized actinically or thermally.

The term "olefinically unsaturated group" or "ethylentically unsaturated group" is employed herein in a broad sense and is intended to encompass any groups containing a >C═C< group. Exemplary ethylenically unsaturated groups include without limitation acryloyl, methacryloyl, allyl, vinyl, styrenyl, or other C═C containing groups.

As used herein, "actinically" in reference to curing, crosslinking or polymerizing of a polymerizable composition, a prepolymer or a material means that the curing (e.g., crosslinked and/or polymerized) is performed by actinic irradiation, such as, for example, UV irradiation, ionized radiation (e.g. gamma ray or X-ray irradiation), microwave irradiation, and the like. Thermal curing or actinic curing methods are well-known to a person skilled in the art.

A "hydrophilic monomer" refers to a monomer which can be polymerized to form a polymer that is water-soluble or can absorb at least 10 percent by weight of water.

A "hydrophobic monomer", as used herein, refers to a monomer which is polymerized to form a polymer that is insoluble in water and can absorb less than 10 percent by weight water.

A "macromer" refers to a medium and high molecular weight compound which can be polymerized and/or cross-linked and comprise one or more actinically-crosslinkable groups. Medium and high molecular weight typically means average molecular weights greater than 700 Daltons.

A "prepolymer" refers to a starting polymer which contains actinically crosslinkable groups and can be cured (e.g., crosslinked) actinically to obtain a crosslinked polymer having a molecular weight much higher than the starting polymer.

A "silicone-containing prepolymer" refers to a prepolymer which contains silicone and can be crosslinked actinically to obtain a crosslinked polymer having a molecular weight much higher than the starting polymer.

"Molecular weight" of a polymeric material (including monomeric or macromeric materials), as used herein, refers to the number-average molecular weight unless otherwise specifically noted or unless testing conditions indicate otherwise.

"Polymer" means a material formed by polymerizing one or more monomers.

As used herein, the term "multiple" refers to three or more.

A "photoinitiator" refers to a chemical that initiates radical crosslinking/polymerizing reaction by the use of light. Suitable photoinitiators include, without limitation, benzoin methyl ether, diethoxyacetophenone, a benzoylphosphine oxide, 1-hydroxycyclohexyl phenyl ketone, Darocure® types, and Irgacure® types, preferably Darocure® 1173, and Irgacure® 2959.

A "thermal initiator" refers to a chemical that initiates radical crosslinking/polymerizing reaction by the use of heat energy. Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is 2,2'-azobis (isobutyronitrile) (AIBN).

A "spatial limitation of actinic radiation" refers to an act or process in which energy radiation in the form of rays is directed by means of, for example, a mask or screen or combinations thereof, to impinge, in a spatially restricted manner, onto an area having a well defined peripheral boundary. For example, a spatial limitation of UV radiation can be achieved by using a mask or screen which has a transparent or open region (unmasked region) surrounded by a UV impermeable region (masked region), as schematically illustrated in FIGS. 1-9 of U.S. Pat. No. 6,627,124 (herein incorporated by reference in its entirety). The unmasked region has a well defined peripheral boundary with the masked region.

The term "fluid" as used herein indicates that a material is capable of flowing like a liquid.

The term "fluid" as used herein indicates that a material is capable of flowing like a liquid.

The term "alkyl" refers to a monovalent radical obtained by removing a hydrogen atom from a linear or branched alkane compound. An alkyl group (radical) forms one bond with one other group in an organic compound.

The term "alkylene" refers to a divalent radical obtained by removing one hydrogen atom from an alkyl. An alkylene group (or radical) forms two bonds with other groups in an organic compound.

In this application, the term "substituted" in reference to an alkylene divalent radical or an alkyl radical means that the alkylene divalent radical or the alkyl radical comprises at least one substituent which replaces one hydrogen atom of the alkylene or alkyl radical and is selected from the group consisting of hydroxyl, carboxyl, —NH$_2$, sulfhydryl, C$_1$-C$_4$ alkyl, C$_1$-C$_4$ alkoxy, C$_1$-C$_4$ alkylthio (alkyl sulfide), C$_1$-C$_4$ acylamino, C$_1$-C$_4$ alkylamino, di-C$_1$-C$_4$ alkylamino, halogen atom (Br or Cl), and combinations thereof.

A "Silicones bearing pendant substituted pyrrolidone groups" refers to silicones of the formula:

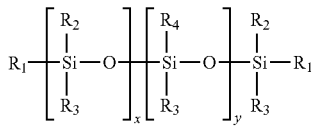

Where R1 is alkyl, or alkyl substituted with hydroxyl or aminic groups and where Y is from 0.05 to 0.5, and X+Y is 1.0

R2 and R3 are independently any C1 to C7 aryl, alkyl or substituted aryl or alkyl hydrocarbon chain And R4 is any organic group comprising with pyrrolidone ring, to wit:

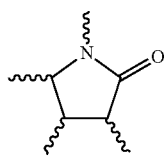

Where the wavy bond represents either a connection point or group of bridging atoms (generally a C1 to C3 alkyl group) to the silicone atom; or it represents a hydrogen atom, or monovalent radical consisting of an alkyl chain, a functional group such as carboxylic acid or an amidized or esterified functional group.

A "silicone bearing a pendant substituted or unsubstituted 2-pyrrolidone-4-carboxylic acid group" refers to a poly (dimethylsiloxane) in which a multiplicity of methyl groups have a hydrogen atom replaced by a compound of the formula —R-Pyr-CA-X in which R is a C2-C6 alkyl group; Pyr is 5-membered heterocyclic pyrolidone group, wherein R is attached to the N atom and the carbonyl is on carbon-2; and in which the 4-position is substituted with the CA-X, which is a carboxylic acid, amide, or ester.

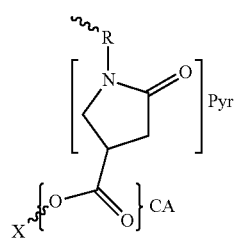

"Surface modification" or "surface treatment", as used herein, means that an article has been treated in a surface treatment process (or a surface modification process) prior to or posterior to the formation of the article, in which (1) a coating is applied to the surface of the article, (2) chemical species are adsorbed onto the surface of the article, (3) the chemical nature (e.g., electrostatic charge) of chemical groups on the surface of the article are altered, or (4) the surface properties of the article are otherwise modified.

Exemplary surface treatment processes include, but are not limited to, a surface treatment by energy (e.g., a plasma, a static electrical charge, irradiation, or other energy source), chemical treatments, the grafting of hydrophilic vinylic monomers or macromers onto the surface of an article, mold-transfer coating process disclosed in U.S. Pat. No. 6,719,929 (herein incorporated by reference in its entirety), the incorporation of wetting agents into a lens formulation for making contact lenses proposed in U.S. Pat. Nos. 6,367,929 and 6,822,016 (herein incorporated by references in their entireties), reinforced mold-transfer coating disclosed in U.S. Pat. No. 7,858,000 (herein incorporated by reference in its entirety), and a hydrophilic coating composed of covalent attachment and/or physical deposition of one or more layers of one or more hydrophilic polymer onto the surface of a contact lens disclosed in U.S. Pat. Nos. 8,147,897 and 8,409,599 and US Patent Application Publication Nos. 2011/0134387, 2012/0026457 and 2013/0118127 (herein incorporated by references in their entireties).

A "percentage of reduction in mold separation force" or "$R_{MSF}$ %" is calculated by the following formula $$R_{MSF}\ \% = \frac{MSF_o - MSF_{releasing\ agent}}{MSF_o} \times 100$$

in which $MSF_{releasing\ agent}$ is the averaged mold separation force measured with molds with a coat of a releasing agent or a mold releasing agent is added into lens forming material prior to lens curing; $MSF_o$ is the averaged mold separation force measured with molds without coat of releasing agent or without adding a mold releasing agent into lens forming material prior to lens curing as control, when being used in cast molding of ophthalmic lenses (preferably contact lenses) from a fluid lens-forming composition.

The term "mold separation force" as used herein refers to a force required for separating a mold after casting molding a contact lens from a lens-forming composition in the mold. Mold separation force is proportional to adhesion between a mold and a lens cast-molded therein.

An "averaged mold separation force" refers to a value obtained by averaging at least 3, preferably at least 5, more preferably at least 10, independent measurements of mold separation force (i.e., 10 testing samples).

A "star-tear" refers to a star-shaped tear in the lens consisting of tearing lines radiating outwardly from one point. Star tears are acceptable in a lens if there are at most three (3) in one lens and all have a dimension of 2.5 mm×2.5 mm or smaller at 13-times magnification when viewed under an Optispec shadowgraph. If a lens has more than three star tears or if any star tear is larger than 2.5 mm×2.5 mm at 13-times magnification when viewed under an Optispec shadowgraph, the lens is not acceptable. Star tears are defects which commonly occur due to high lens-mold adhesion during mold separation.

A "% WR of total lenses" refers to the proportion of whole lenses obtained, even if those lenses have minor defect such as less than 3 star-tears out of the total number of lenses.

A "molding surface" of a mold half of a mold refers to a mold half's surface which is in direct contact with a lens-forming composition.

In general, the invention is directed to a method for producing ophthalmic lenses, preferably contact lenses, more preferably silicone hydrogel contact lenses. A method of the invention is characterized by minimizing lens defects generated during mold opening and de-molding process.

The invention is partly based on the discovery that substantial reduction of mold separation force in cast molding of silicone hydrogel contact lenses from a silicone hydrogel lens-forming composition can be achieved by applying a coat of fatty amines of carbon chain length C18 or less, such as, e.g., Stearyl amine HCL or silicones bearing pendant substituted pyrrolidone groups on the molding surfaces of a mold, when a reusable mold is used to make the lenses, wherein the reusable mold is made from materials, for example, such as glass, PMMA, quartz, TOPAS® or $CaF_2$) and that lens defects (e.g., partially or completely torned lenses, star tears per lens) derived from mold opening and lens removal from a mold can be substantially reduced or eliminated. By using such method, one can increase the product yield and lens quality.

Although the inventors do not wish to be bound by any particular theory, it is believed that an relatively-intact and stable coat of a mold releasing agent selected from the group consisting of releasing fatty amines of carbon chain length C18 or less, such as, e.g., Stearyl amine HCL and silicones bearing pendant substituted pyrrolidone groups can be formed by applying a thin film of the mold releasing agent(s) solution onto the molding surface of the mold and drying the aqueous mold releasing agent(s) solution on the mold surfaces. Such a coat is believed to be composed on one or more layers of the mold releasing agent(s) and to be stable sufficiently to remain intact during the step of introducing a fluid lens-forming composition into the mold. This coat may effectively prevent lens material interacting with the mold surfaces. For example, glass mold surfaces generally contain silanol groups which can form hydrogen bonding with the hydrophilic components or moieties of lens materials (e.g., hydrophilic monomeric units including N,N-dimethylacrylamide or N-vinylpyrrolidone, amide bonds, urethane bonds, etc.). The hydrogen bonds formed between mold surfaces and a lens material would result in strong adhesion between the molded lens and the mold, i.e., high mold separation force. Further, because of their small averaged molecular weight (less than 5000 daltons), the mold releasing agent molecules in the coat would be too small for them to be entangled with the polymer matrix of the lens material, so as not to effectively become the integral parts of the lens material and thereby not to increase the adhesion between the lens material and the mold surfaces. In addition, the intactness of the coat of mold releasing agent can be important in producing ophthalmic lenses (preferably contact lenses, more preferably silicone hydrogel contact lenses) with consistently and relatively high lens quality (i.e., with minimal or no micro-tears). It is believed that when the molding surface is not covered with an intact coat (e.g., broken areas, holes, and/or micro-holes), localized lens-to-mold adhesion in those defected areas can may cause lens defects such as star tears or large tears during mold opening and lens removal processes. A coat of mold releasing agent selected from a group consisting of releasing fatty amines of carbon chain length C18 or less, such as, e.g., Stearyl amine HC and silicones bearing pendant substituted pyrrolidone groups of the invention is believed to be substantially free of such defects and thereby can enhance the quality of lenses to be produced (e.g., minimal number of star tears per lens on average.

The invention, in one aspect, provides a method for making contact lenses, comprising the steps of:

(1) providing a contact lens mold, wherein the mold has a first mold half with a first molding surface defining the anterior surface of a contact lens and a second mold half with a second molding surface defining the posterior surface of the ophthalmic lens, wherein said first and second mold halves are configured to receive each other such that a cavity is formed between said first and second molding surfaces;

(2) applying a layer solution of mold releasing agent selected from the group consisting of fatty amines of carbon chain length C18 or less and silicones bearing pendant substituted pyrrolidone groups onto the first molding surface and/or the second molding surface, wherein the weight percentage of mold releasing agent in the solution is from 0.01% to 10% based on the entire weight of the solution;

(3) at least partially drying said layer solution to form a coat of the releasing agent on the first and/or second molding surface, wherein the formation of the coat of the releasing agent vesicles on the first and/or second molding surfaces is characterized by having a percentage of reduction in mold separation force of at least about 50% relative to a control mold without any coat of the releasing agent vesicles thereon, (4) introducing a fluid composition into the cavity formed by the first and second molding surfaces with the coat of the mold releasing agent formed in step (3) thereon, wherein the fluid composition comprises a lens-forming material, wherein the lens-forming material is crosslinkable and/or polymerizable by actinic radiation;

(5) crosslinking/polymerizing the lens-forming material in the mold to form a contact lens having a polymer matrix; and (6) separating the mold and removing the formed contact lens from the mold.

In accordance with the invention, an increased production yield is intended to describe that the yield of contact lens production is increased by adding a mold releasing agent in a lens-forming composition. An "improved lens quality" is intended to describe that the quality of produced contact lenses is improved in the presence of a mold releasing agent in a lens-forming composition as compared to that in the absence of the mold releasing agent.

In a preferred embodiment, the mold releasing agent is present in an amount sufficient to reduce mold separation force by at least about 50%.

In accordance with the present invention, a fluid composition is a solution or a solvent-free liquid or melt at a temperature below about 80° C. A fluid composition can optionally further include various components, such as photoinitiator, visibility tinting agent, fillers, and the like. A fluid composition of the invention can further include other components, such as a photoinitiator, a visibility tinting agent, a filler, an antimicrobial agent, a lubricant, a UV-blocking agent, a photosensitizer, or a mixture thereof.

Any lens-forming materials can be used in the invention. Lens forming materials that are suitable in the fabrication of contact lenses are illustrated by numerous issued US patents and familiar to those skilled in the art. Preferred lens-forming materials are capable of forming hydrogels. A lens-forming material can be a prepolymer, a mixture of prepolymers, a mixture of monomers, or a mixture of one or more prepolymers and one or more monomers and/or macromers. It should be understood that any silicone-containing prepolymers or any silicone-free prepolymers can be used in the present invention. According to the present invention, the fluid lens-forming composition comprises at least one member selected from the group consisting of a hydrophilic vinylic monomer, a silicone containing vinylic monomer, a silicone-containing crosslinker, a silicone-containing prepolymer, a hydrophilic prepolymer free of silicone, and combinations thereof.

A solution of a lens-forming material can be prepared by dissolving the lens-forming material in any suitable solvent known to a person skilled in the art. Examples of suitable solvents are water, alcohols, such as lower alkanols (e.g., ethanol, methanol or isopropanol), carboxylic acid amides (e.g., dimethylformamide), dipolar aprotic solvents, such as dimethyl sulfoxide or methyl ethyl ketone, ketones (e.g., acetone or cyclohexanone), hydrocarbons (e.g., toluene, ethers, THF, dimethoxyethane or dioxane), and halogenated hydrocarbons (e.g., trichloroethane), and mixtures of suitable solvents (e.g., mixtures of water with an alcohol, a water/ethanol or a water/methanol mixture).

Polymerizable materials (or silicone hydrogel lens-forming materials) for making contact lenses are well known to a person skilled in the art. A polymerizable material can comprise at least one silicon-containing prepolymer, monomer, macromer or combination thereof. In accordance with the invention, the polymerizable material comprises at least one silicone-containing prepolymer. The silicone prepolymer comprises actinically crosslinkable groups, preferably at least three actinically crosslinkable groups selected from the group consisting of acryl groups, thiol groups, ene-containing groups, and combination thereof.

Where crosslinking of a prepolymer of the invention is based on the mechanism of free radical chain-growth polymerization, the prepolymer comprises at least two acryl groups, preferably at least three acryl groups.

Where crosslinking of a prepolymer of the invention is based on the mechanism of thiol-ene step-growth radical polymerization, the actinically crosslinkable groups of the prepolymer preferably comprises at least three thiol groups or at least three ene-containing groups.

Where the prepolymer comprises multiple ene-containing groups, these groups undergo thiol-ene step-growth radical polymerization in the presence of thiol groups which can be provided by a step-growth-crosslinking agent having two or more thiol groups. Similarly, where the prepolymer comprises multiple thiol groups, these groups undergo thiol-ene step-growth radical polymerization in the presence of ene-containing groups which can be provided by a step-growth-crosslinking agent having two or more ene-containing groups.

Any suitable actinically-crosslinkable silicone-containing prepolymer can be used in the invention. Preferably, a silicone-containing prepolymer comprises hydrophilic segments and hydrophobic segments. Examples of silicone-containing prepolymers are those described in commonly-owned U.S. Pat. Nos. 6,039,913, 7,091,283, 7,268,189 and 7,238,750, and U.S. patent application Ser. No. 09/525,158 filed Mar. 14, 2000 (entitled "Organic Compound"), Ser. No. 11/825,961, 60/869,812 filed Dec. 13, 2006 (entitled "Production of Ophthalmic Devices Based on Photo-Induced Step Growth Polymerization", 60/869,817 filed Dec. 13, 2006 (entitled "Actinically Curable Silicone Hydrogel Copolymers and Uses thereof"), 60/896,325 filed Mar. 22, 2007 ("Prepolymers with Dangling Polysiloxane-Containing Polymer Chains"), 60/896,326 filed Mar. 22, 2007 ("Silicone-Containing Prepolymers with Dangling Hydrophilic Polymeric Chains"), US 2008/0015315 ("Novel Polymer") and US 2008/0152800 ("Process for the Coating of Biomedical Articles") which are incorporated herein by references in their entireties.

A silicone-containing prepolymer of the invention is capable of forming, preferably in the absence of any hydrophilic vinylic monomer, a silicone hydrogel or contact lens, which has a high oxygen permeability (characterized by an apparent oxygen permeability of at least 40 barrers, preferably at least about 60 barrers, even more preferably at least 80 barrers) and a hydrophilic surface (characterized by having an averaged water contact angle of less than about 90 degrees or less, preferably about 80 degrees or less, more preferably about 70 degrees or less, even more preferably about 60 degrees or less). The silicone hydrogel material or contact lens preferably has a high ion permeability (characterized by an Ionoflux Diffusion Coefficient, D, of greater than about $1.5 \times 10^{-6}$ mm$^2$/min, preferably greater than about $2.6 \times 10^{-6}$ mm$^2$/min, more preferably greater than about $6.4 \times 10^{-6}$ mm$^2$/min). The silicone hydrogel material or contact lens preferably has an elastic modulus of from about 0.2 MPa to about 2.0 MPa, preferably from about 0.3 MPa to about 1.5 MPa, more preferably from about 0.4 MPa to about 1.2 MPa. The ion permeability, oxygen permeability and elastic modulus water content of a silicone hydrogel contact lens can be measured as described in U.S. Pat. No. 5,849,811. The silicone hydrogel material or contact lens preferably has a water content of preferably from about 15% to about 80%, more preferably from about 20% to about 65% by weight when fully hydrated. The water content of a silicone hydrogel contact lens can be measured according to Bulk Technique as disclosed in U.S. Pat. No. 5,849,811.

Preferably, the prepolymers used in the invention are previously purified in any known manner, for example, by precipitation with organic solvents, such as acetone, filtration and washing, extraction in a suitable solvent, dialysis or ultrafiltration, ultrafiltration being especially preferred. By means of that purification process the prepolymers can be obtained in extremely pure form, for example in the form of concentrated solutions that are free, or at least substantially free, from reaction products, such as salts, and from starting materials. The preferred purification process for the prepolymers used in the process according to the invention, ultrafiltration, can be carried out in a manner known to a person skilled in the art. It is possible for the ultrafiltration to be carried out repeatedly, for example from two to ten times. Alternatively, the ultrafiltration can be carried out continuously until the selected degree of purity is attained. The selected degree of purity can in principle be as high as desired. A suitable measure for the degree of purity is, for example, the concentration of dissolved salts obtained as by-products, which can be determined simply in known manner. Thus, after polymerization, the device will not require subsequent purification such as, for example, costly and complicated extraction of unpolymerized matrix-forming material. Furthermore, crosslinking of the prepolymer can take place absent a solvent or in aqueous solution so that a subsequent solvent exchange or the hydration step is not necessary.

Any monomers suitable for making contact lenses can be used in the invention. Preferably, vinylic monomers are used in the invention.

Examples of silicone-containing vinylic monomers include, without limitation, methacryloxyalkylsiloxanes, 3-methacryloxy propylpentamethyldisiloxane, bis(methacryloxypropyl)tetramethyl-disiloxane, monomethacrylated polydimethylsiloxane, mercapto-terminated polydimethylsiloxane, N-[tris(trimethylsiloxy)silylpropyl]acrylamide, N-[tris(trimethylsiloxy)silylpropyl]methacrylamide, tris (pentamethyldisiloxyanyl)-3-methacrylatopropylsilane (T2), and tristrimethylsilyloxysilylpropyl methacrylate (TRIS). A preferred siloxane-containing monomer is TRIS, which is referred to 3-methacryloxypropyltris(trimethylsiloxy) silane, and represented by CAS No. 17096-07-0. The term "TRIS" also includes dimers of 3-methacryloxypropyltris(trimethylsiloxy) silane.

Any suitable siloxane-containing macromer with ethylenically unsaturated group(s) can be used to produce a silicone hydrogel material. A particularly preferred siloxane-containing macromer is selected from the group consisting of Macromer A, Macromer B, Macromer C, and Macromer D described in U.S. Pat. No. 5,760,100, herein incorporated by reference in its entirety. Macromers that contain two or more polymerizable groups (vinylic groups) can also serve as cross linkers. Di and triblock macromers consisting of polydimethylsiloxane and polyakyleneoxides could also be of utility. Such macromers could be mono or difunctionalized with acrylate, methacrylate or vinyl groups. For example one might use methacrylate end capped polyethyleneoxide-block-polydimethylsiloxane-block-polyethyleneoxide to enhance oxygen permeability.

In accordance with the present invention, a polymerizable material can also comprise a hydrophilic vinylic monomer. Nearly any hydrophilic vinylic monomer that can act as a plasticizer can be used in the fluid composition of the invention. Among the preferred hydrophilic monomers are N,N-dimethylacrylamide (DMA), 2-hydroxyethylmethacrylate (HEMA), hydroxyethyl acrylate, hydroxypropyl acrylate, hydroxypropyl methacrylate (HPMA), trimethylammonium 2-hydroxy propylmethacrylate hydrochloride, dimethylaminoethyl methacrylate (DMAEMA), dimethylaminoethylmethacrylamide, acrylamide, methacrylamide, allyl alcohol, vinylpyridine, glycerol methacrylate, N-(1,1dimethyl-3-oxobutyl)acrylamide, N-vinyl-2-pyrrolidone (NVP), acrylic acid, methacrylic acid, and N,N-dimethyacrylamide (DMA).

A polymerizable material can also comprise a hydrophobic monomer. By incorporating a certain amount of hydrophobic vinylic monomer in a polymerizable fluid composition, the mechanical properties (e.g., modulus of elasticity) of the resultant polymer may be improved.

Examples of water-soluble actinically crosslinkable prepolymers include, but are not limited to, a water-soluble crosslinkable polyurea prepolymer described in U.S. Pat. No. 6,479,587 or in U.S. Patent Application publication No. 2005/0113549 A1 (herein incorporated by reference in their entireties); a water-soluble crosslinkable poly(vinyl alcohol) prepolymer described in U.S. Pat. Nos. 5,583,163 and 6,303,687 (incorporated by reference in their entireties); a water-soluble crosslinkable poly(oxyalkylene)-containing polyurethane prepolymer disclosed in U.S. patent application publication No. 2004/0082680 A1 (herein incorporated by reference); a water-soluble crosslinkable poly(oxyalkylene)-containing polyamide prepolymer disclosed in a copending U.S. Patent Application No. 60/630,164 filed Nov. 22, 2004 entitled "Crosslinkable Poly(oxyalkylene)-Containing Polyamide Prepolymers" (herein incorporated by reference in its entirety); derivatives of a polyvinyl alcohol, polyethyleneimine or polyvinylamine, which are disclosed in U.S. Pat. No. 5,849,841 (incorporated by reference in its entirety); crosslinkable polyacrylamide; crosslinkable statistical copolymers of vinyl lactam, MMA and a comonomer, which are disclosed in EP 655,470 and U.S. Pat. No. 5,712,356; crosslinkable copolymers of vinyl lactam, vinyl acetate and vinyl alcohol, which are disclosed in EP 712,867 and U.S. Pat. No. 5,665,840; polyetherpolyester copolymers with crosslinkable side chains which are disclosed in EP 932,635 and U.S. Pat. No. 6,492,478; branched polyalkylene glycol-urethane prepolymers disclosed in EP 958,315 and U.S. Pat. No. 6,165,408; poly-alkylene glycol-tetra(meth)acrylate prepolymers disclosed in EP 961,941 and U.S. Pat. No. 6,221,303; and crosslinkable polyallylamine gluconolactone prepolymers disclosed in PCT patent application WO 2000/31150 and U.S. Pat. No. 6,472,489.

The polymerizable material can optionally but preferably does not comprise one or more monomer and/or one or more crosslinking agents (i.e., compounds with two or more vinylic groups or three or more thiol or ene-containing groups and with molecular weight less than 700 Daltons). However, the amount of those components should be low such that the final ophthalmic device does not contain unacceptable levels of unpolymerized monomers and/or crosslinking agents. The presence of unacceptable levels of unpolymerized monomers and/or crosslinking agents will require extraction to remove them, which requires additional steps that are costly and inefficient. But preferably, the polymerizable material is substantially free of monomer and crosslinking agent (i.e., preferably about 2% or less, more preferably about 1% or less, even more preferably about 0.5% or less by weight of combination of monomer and crosslinking agent).

It must be understood that a fluid composition can also comprise various components, such as, for example, polymerization initiators (e.g., photoinitiator or thermal initiator), a visibility tinting agent (e.g., dyes, pigments, or mixtures thereof), UV-blocking (absorbing) agent, photosensitizers, inhibitors, antimicrobial agents (e.g., preferably silver nanoparticles or stabilized silver nanoparticles), bioactive agent, leachable lubricants, fillers, and the like, as known to a person skilled in the art.

Initiators, for example, selected from materials well known for such use in the polymerization art, may be included in the lens-forming material in order to promote, and/or increase the rate of, the polymerization reaction. An initiator is a chemical agent capable of initiating polymerization reactions. The initiator can be a photoinitiator or a thermal initiator.

A photoinitiator can initiate free radical polymerization and/or crosslinking by the use of light. Suitable photoinitiators are benzoin methyl ether, diethoxyacetophenone, a benzoylphosphine oxide, 1-hydroxycyclohexyl phenyl ketone and Darocur and Irgacur types, preferably Darocur 1173® and Darocur 2959®. Examples of benzoylphosphine initiators include 2,4,6-trimethylbenzoyldiphenylophosphine oxide; bis-(2,6-dichlorobenzoyl)-4-N-propylphenylphosphine oxide; and bis-(2,6-dichlorobenzoyl)-4-N-butylphenylphosphine oxide. Reactive photoinitiators which can be incorporated, for example, into a macromer or can be used as a special monomer are also suitable. Examples of reactive photoinitiators are those disclosed in EP 632 329, herein incorporated by reference in its entirety. The polymerization can then be triggered off by actinic radiation, for example light, in particular UV light of a suitable wavelength. The spectral requirements can be controlled accordingly, if appropriate, by addition of suitable photosensitizers Examples of suitable thermal initiators include, but are not limited to, 2,2'-azobis(2,4-dimethylpentanenitrile), 2,2'-azobis(2-methylpropanenitrile), 2,2'-azobis(2-methylbutanenitrile), peroxides such as benzoyl peroxide, and the like. Preferably, the thermal initiator is azobisisobutyronite (AIBN).

A fluid composition of the invention can be prepared by dissolving at least one silicone-containing prepolymer and other components in a solvent or a mixture of solvents.

Any suitable organic solvent can be used in the invention so long as it can dissolve the polymerizable material to form a solution. Example of organic solvents includes without limitation tetrahydrofuran, tripropylene glycol methyl ether, dipropylene glycol methyl ether, ethylene glycol n-butyl ether, diethylene glycol n-butyl ether, diethylene glycol methyl ether, ethylene glycol phenyl ether, propylene glycol methyl ether, propylene glycol methyl ether acetate, dipropylene glycol methyl ether acetate, propylene glycol n-propyl ether, dipropylene glycol n-propyl ether, tripropylene glycol n-butyl ether, propylene glycol n-butyl ether, dipropylene glycol n-butyl ether, tripropylene glycol n-butyl ether, propylene glycol phenyl ether dipropylene glycol dimethyl ether, polyethylene glycols, polypropylene glycols, ethyl acetate, butyl acetate, amyl acetate, methyl lactate, ethyl lactate, i-propyl lactate, methylene chloride, 2-butanol, 2-propanol, menthol, cyclohexanol, cyclopentanol and exonorborneol, 2-pentanol, 3-pentanol, 2-hexanol, 3-hexanol, 3-methyl-2-butanol, 2-heptanol, 2-octanol, 2-nonanol, 2-decanol, 3-octanol, norborneol, tert-butanol, tert-amyl, alcohol, 2-methyl-2-pentanol, 2,3-dimethyl-2-butanol, 3-methyl-3-pentanol, 1-methylcyclohexanol, 2-methyl-2-hexanol, 3,7-dimethyl-3-octanol, 1-chloro-2-methyl-2-propanol, 2-methyl-2-heptanol, 2-methyl-2-octanol, 2-2-methyl-2-nonanol, 2-methyl-2-decanol, 3-methyl-3-hexanol, 3-methyl-3-heptanol, 4-methyl-4-heptanol, 3-methyl-3-octanol, 4-methyl-4-octanol, 3-methyl-3-nonanol, 4-methyl-4-nonanol, 3-methyl-3-octanol, 3-ethyl-3-hexanol, 3-methyl-3-heptanol, 4-ethyl-4-heptanol, 4-propyl-4-heptanol, 4-isopropyl-4-heptanol, 2,4-dimethyl-2-pentanol, 1-methylcyclopentanol, 1-ethylcyclopentanol, 1-ethylcyclopentanol, 3-hydroxy-3-methyl-1-butene, 4-hydroxy-4-methyl-1-cyclopentanol, 2-phenyl-2-propanol, 2-methoxy-2-methyl-2-propanol 2,3,4-trimethyl-3-pentanol, 3,7-dimethyl-3-octanol, 2-phenyl-2-butanol, 2-methyl-1-phenyl-2-propanol and 3-ethyl-3-pentanol, 1-ethoxy-2-propanol, 1-methyl-2-propanol, t-amyl alcohol, isopropanol, 1-methyl-2-pyrrolidone, N,N-dimethylpropionamide, dimethyl formamide, dimethyl acetamide, dimethyl propionamide, N-methyl pyrrolidinone, and mixtures thereof.

In a preferred embodiment, the organic solvent is a $C_1$-$C_3$ alkanol, preferably propanol or isopropanol). Preferably, the solvent mixture comprises a second organic solvent which is a $C_4$-$C_{18}$ alkanol.

The fluid composition can be introduced (dispensed) into a cavity formed by a mold according to any known methods.

In accordance with the invention, any fatty amines of carbon chain length C18 or less, can be used in the invention, so long it can reduce average mold separation force. The preferred fatty amines of carbon chain length C18 is Stearyl amine HC (available from Aldrich).

In accordance with the invention, any silicones bearing pendant substituted pyrrolidone groups can be used in the invention, so long it can reduce average mold separation force. The preferred silicones bearing pendant substituted pyrrolidone groups are silicones bearing a pendant substituted or unsubstituted 2-pyrrolidone-4-carboxylic acid group The preferred silicones bearing a pendant substituted or unsubstituted 2-pyrrolidone-4-carboxylic acid group are:
(N-PYRROLIDONEPROPYL)METHYLSILOXANE-DIMETHYLSILOXANE COPOLYMER as shown by the formula 1:

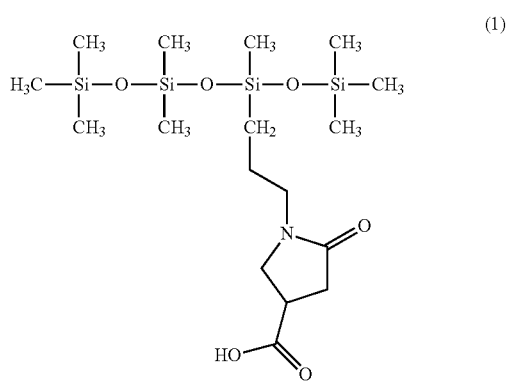

and [(4-N,N-DIMETHYLAMIDO)-1-PYRROLYDINO-PROPYL]METHYLSILOXANE)-(DIMETHYLSILOXANE) COPOLYMER as shown by the formula 2:

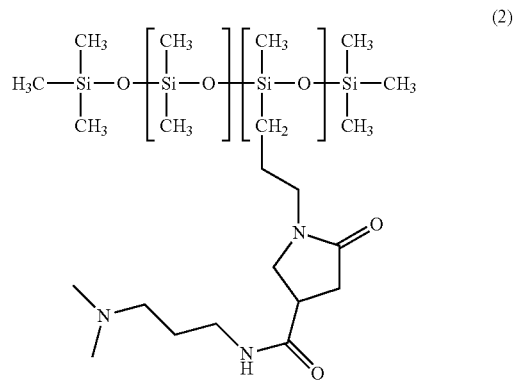

Both preferred silicones bearing pendant substituted pyrrolidone groups are commercially available from Gelest, Inc. Morrisville, Pa., USA.

In accordance with the invention, the described mold releasing agents can be used as an external mold release agent. In this embodiment, the releasing agents can be dissolved in any suitable solvent known to a person skilled in the art before being applied to the mold surface. Then, the mold surface can be at least partially dried. Examples of suitable solvents are water, alcohols, such as lower alkanols (e.g., ethanol, methanol or isopropanol), carboxylic acid amides (e.g., dimethylformamide), dipolar aprotic solvents, such as dimethyl sulfoxide or methyl ethyl ketone, ketones (e.g., acetone or cyclohexanone), hydrocarbons (e.g., toluene, ethers, THF, dimethoxyethane or dioxane), and halogenated hydrocarbons (e.g., trichloroethane), and mixtures of suitable solvents (e.g., mixtures of water with an alcohol, a water/ethanol or a water/methanol mixture). The solution comprises the mold releasing agent, based on the entire weight of the solution, 0.01% to 10%, preferably 0.015 to 5%, and more preferably 0.02 to 2% of the releasing agents. In some cases, the solution comprises the mold releasing agent, based on the entire weight of the solution is a saturated releasing age in water such as YAD-122 (Gelest Inc.) and YBD-125 (Gelest Inc.). The solution of the described mold releasing agents may be applied to the mold surface by any known method, for example, by pipetting, spraying, swabbing, dipping or stamping such that the surface is evenly coated therewith. Spraying using a spray nozzle is preferred. The time required for steps applying mold releasing agents solution to the mold surface and at least partially drying is not critical as such. However, it has to be pointed out that even with very short cycle times, for example, less than 10 seconds, used in today's contact lens production, particularly favorable results may be been obtained.

The mold releasing agents, when used as an external mold release agent, is present in the coat on the at least of one mold surface can reduce an averaged mold separation force by at least about 50%, preferably by at least about 60%, more preferably by at least about 85%.

In accordance with the present invention, a coating of a mold releasing agent solution can be applied to the molding surface of a mold half by contacting the molding surface with one or more coating solutions according to various methods, such as, for examples those methods disclosed in U.S. Pat. Nos. 6,451,871, 6,719,929, 6,793,973, 6,811,805, 6,896,926, which are incorporated herein by references in their entireties.

Contacting of the molding surface of a mold half with a coating solution can occur by dipping it into the coating solution or by spraying it with the coating solution. One coating process involves solely dip-coating and optionally dip-rinsing steps. Another coating process involves solely spray-coating and spray-rinsing steps. However, a number of alternatives involve various combinations of spray- and dip-coating and rinsing steps may be designed by a person having ordinary skill in the art.

The spray coating application may be accomplished via a process selected from the group consisting of an air-assisted atomization and dispensing process, an ultrasonic-assisted atomization and dispensing process, a piezoelectric assisted atomization and dispensing process, an electro-mechanical jet printing process, a piezo-electric jet printing process, a piezo-electric with hydrostatic pressure jet printing process, and a thermal jet printing process; and a computer system capable of controlling the positioning of the dispensing head of the spraying device on the ophthalmic lens and dispensing the coating liquid. Those spraying coating processes are described in U.S. Pat. No. 6,811,805.

The step of drying the coating can be carried out according to any methods known to a person skilled in the art. Preferably, the drying step is carried out under the stream of an inert gas (e.g., nitrogen)

The fluid lens-forming composition can be introduced (dispensed) into a cavity formed by a mold according to any known methods.

A person skilled in the art will know well how to cast mold lenses from a polymerizable material in molds based on thermal or actinic polymerization.

After the fluid lens-forming composition is dispensed into the mold, polymerization/crosslinking can be initiated actinically, by means of actinic radiation, such as UV/visible light irradiation, ionizing radiation (e.g., gamma or X-ray irradiation).

Lens molds for making contact lenses are well known to a person skilled in the art and, for example, are employed in cast molding or spin casting. For example, a mold (for cast molding) generally comprises at least two mold sections (or portions) or mold halves, i.e. first and second mold halves.

The first mold half defines a first molding (or optical) surface and the second mold half defines a second molding (or optical) surface. The first and second mold halves are configured to receive each other such that a lens forming cavity is formed between the first molding surface and the second molding surface. The molding surface of a mold half is the cavity-forming surface of the mold and in direct contact with lens-forming material.

Methods of manufacturing mold sections for cast-molding a contact lens are generally well known to those of ordinary skill in the art. The process of the present invention is not limited to any particular method of forming a mold. In fact, any method of forming a mold can be used in the present invention. The first and second mold halves can be formed through various techniques, such as injection molding or lathing. Examples of suitable processes for forming the mold halves are disclosed in U.S. Pat. No. 4,444,711 to Schad; U.S. Pat. No. 4,460,534 to Boehm et al.; U.S. Pat. No. 5,843,346 to Morrill; and U.S. Pat. No. 5,894,002 to Boneberger et al., which are also incorporated herein by reference.

Virtually all materials known in the art for making molds can be used to make molds for making contact lenses. For example, polymeric materials, such as polyethylene, polypropylene, polystyrene, PMMA, Topas® COC grade 8007-S10 (clear amorphous copolymer of ethylene and norbornene, from Ticona GmbH of Frankfurt, Germany and Summit, N.J.), or the like can be used. Preferable mold materials are those allow UV light transmission and could be used to make reusable molds, such as quartz, glass, $CaF_2$, PMMA and sapphire.

In a preferred embodiment, reusable molds are used and the fluid composition is cured actinically under a spatial limitation of actinic radiation to form a contact lens. Examples of preferred reusable molds are those disclosed in U.S. patent application Ser. No. 08/274,942 filed Jul. 14, 1994, Ser. No. 10/732,566 filed Dec. 10, 2003, Ser. No. 10/721,913 filed Nov. 25, 2003, and U.S. Pat. No. 6,627,124, which are incorporated by reference in their entireties.

Opening of the mold so that the molded lens can be removed from the mold may take place in a manner known to a person skilled in the art.

The invention, in another aspect, provides a method for producing a contact lens, comprising: the steps of:

(1) introducing a fluid composition into a mold for making a contact lens, wherein the fluid composition comprises a lens-forming material and a mold releasing agent selected from the group consisting of a fatty amine of carbon chain length C18 or less and a silicones bearing pendant substituted pyrrolidone groups, wherein the lens-forming material is crosslinkable and/or polymerizable by actinic radiation or by heating;

(2) crosslinking/polymerizing the lens-forming material in the mold to form a lens having a polymer matrix, wherein at least part of the mold releasing agent migrates to the interface between the mold and the polymer matrix of the formed lens; and (3) separating the mold, wherein the mold releasing agent is present in an amount sufficient to reduce an averaged mold separation force by at least about 50% in comparison with that without the releasing agent.

In accordance with the invention, the described mold releasing agent can also be used as an internal mold release agent. In this embodiment, the mold releasing agent can present in the fluid composition in an amount of up to 10% by weight, preferably up to 5% by weight, more preferably from 0.1% to 5% by weight, even more preferably from 0.5% to 4% by weight and in particular from 1% to 2% by weight, each based on the entire weight of the fluid composition.

The mold releasing agent, when used as an internal releasing agent, is present in the fluid composition in an amount sufficient to reduce an averaged mold separation force by at least about 50%, preferably by at least about 60%, more preferably by at least about 85%, in comparison with that without the mold releasing agent (i.e., compared with the averaged mold separation force obtained when replacing the fluid composition with a control composition). The control composition comprises all components except the mold releasing agent of the fluid composition (i.e., free of the mold releasing agent).

The previous disclosure will enable one having ordinary skill in the art to practice the invention. In order to better enable the reader to understand specific embodiments and the advantages thereof, reference to the following examples is suggested.

EXPERIMENTS

Molds:
Re-usable Lightstream molds (designed according U.S. Pat. No. 6,800,225) are made of N-B270 soda lime glass for female and quartz for male molds.
Lens Production:
UV crosslinking is performed by irradiation of the molds, filled with the appropriate formulation, by an UV light source.
Evaluations:
Mold separation force is measured using Zwick tensile test machine (Zwick Z 2.5) and a mold assembly which is disclosed in detail in U.S. Pat. No. 6,203,909 B1 (herein incorporated by reference in its entirety). Re-usable Lightstream molds (designed according U.S. Pat. No. 6,800,225) each comprise a female mold half made of glass and a male mold half made of quartz. The female mold half of one mold assembly is mounted rigidly onto the bottom of the machine, the male mold half is attached to the machine with a cardanic suspension device to enable force-free alignment.
Assessment of Quality of Molded Lenses
The quality of molded lenses is inspected under a 13-times magnification Optispec Shadowgraph. Detailed description of all lens defects were collected, and lens quality was summarized using % WR.

Experiment 1

Synthesis of α,α'-dihydroxy terminated poly(N,N-dimethyl acrylamide) (pDMA-(OH)$_2$)

This pDMA was prepared by radical polymerization of DMA using 3-mercapto-1,2-propanediol as the chain transfer reagent. The chain transfer agent not only introduces the hydroxyl groups but also control the molecular weight of the polymer. In one example, DMA (44.410 g, 448 moll), AIBN (0.184 g, 1.12 moll), 3-mercapto-1,2-propanediol (6.687 g, 61.8 mmol), ethyl acetate (10.2 g) and toluene (102.6 g) were introduced into a 500 mL Jacketed Reactor equipped with a condensor, overhead stirrer, and gas dispense tube. The solution was purged with N$_2$ gas for 30 min at room temperature, before it was heated to 58° C. After reaction for 50 mins, the solution was purged with air and immediately siphoned to a flask immersed in an icebath. GC and GPC samples were taken at the beginning and end of the reaction for determining monomer conversion and molecular weight, respectively. The reaction solution was then concentrated to about 70 g using rotavap under vacuum at 30° C. before being slowly added to 800 mL of hexanes with stirring. After the addition ws complete, the solution settled down for 10 mins without stirring and the supernantant liquid was decanted. 100-150 mL of THF was added to dissolve the polymer and the solution was then concentrated to about 70 g using the roatvap. The purification process was repeated two more times. The polymer solution in THF was then solvent exchanged to toluene and transferred to an amber bottle. The final weight of the solution was adjusted to 90 g by adding toluene. In the end, 10 g of ethyl acetate was added to this solution. To obtain enough pDMA for reactions, several different batches of pDMA solution were combined. The solid content of the solution was measured by gravimetric method. OH content of the polymer was determined by titration.

Experiment 2

Preparation of Stock Solution of (pDMA-(OH)$_2$) and HO-pDMS-OH

α,ω-dihydroxy pDMS was dried under vacuum at 60° C. overnight. The proper amount of pDMS was added to the above prepared pDMA solution to obtain a pDMA/pDMS stock solution. Molecular sieve (4 Å) was added to the stock solution. The OH content of the solution was determined by OH titration.

Experiment 3

Synthesis of pDMA Grafted pDMS Macromer with Random Structure

In this example, a macromer with 35% pDMA was prepared. Prior to synthesis, a 200 mL Schlenk flask, stir bar, and gas tight syringes were oven dried overnight. 50.56 g pDMA/pDMS stock solution (27.55 wt % PDMA and 32.43% PDMS in toluene, 1.426 meq/g OH of the solution) and 26.0 g of toluene were added into the flask. 25-27 g of solvent from the flask was stripped off under vacuum at 80° C. After the flask was backfilled with N$_2$, 26 g of dry toluene was added using the airtight syringe. The solution was vacuum stripped again to remove 25-27 g of solvent, followed by backfill with N$_2$. The final solution weight was recorded as X. The flask was then put on an oil bath at 40° C. 0.3 g sample was taken for Karl Fischer titration. The needed amount of HMDI was calculated based on the equation below:

$$HMDI(g) = 1.10 \times \frac{[(X - wt.KarlFisherSample) \times 69.232/X]}{11.891}$$

HMDI was added to the reactions solution with the gas-tight syringe, followed by addition of 5.693 g of dry ethyl acetate. 3 drops of catalyst (DBTDL) were added with a second, clean & dry syringe. The solution was mixed for 3 hours before the flask was removed out of the oil bath and cooled to room temperature. The required amount of HEAA was then added with additional 3 drops of catalyst. The reaction continues overnight.

HEAA (g) = [(76.155-69.232] * 1.4] / 8.69

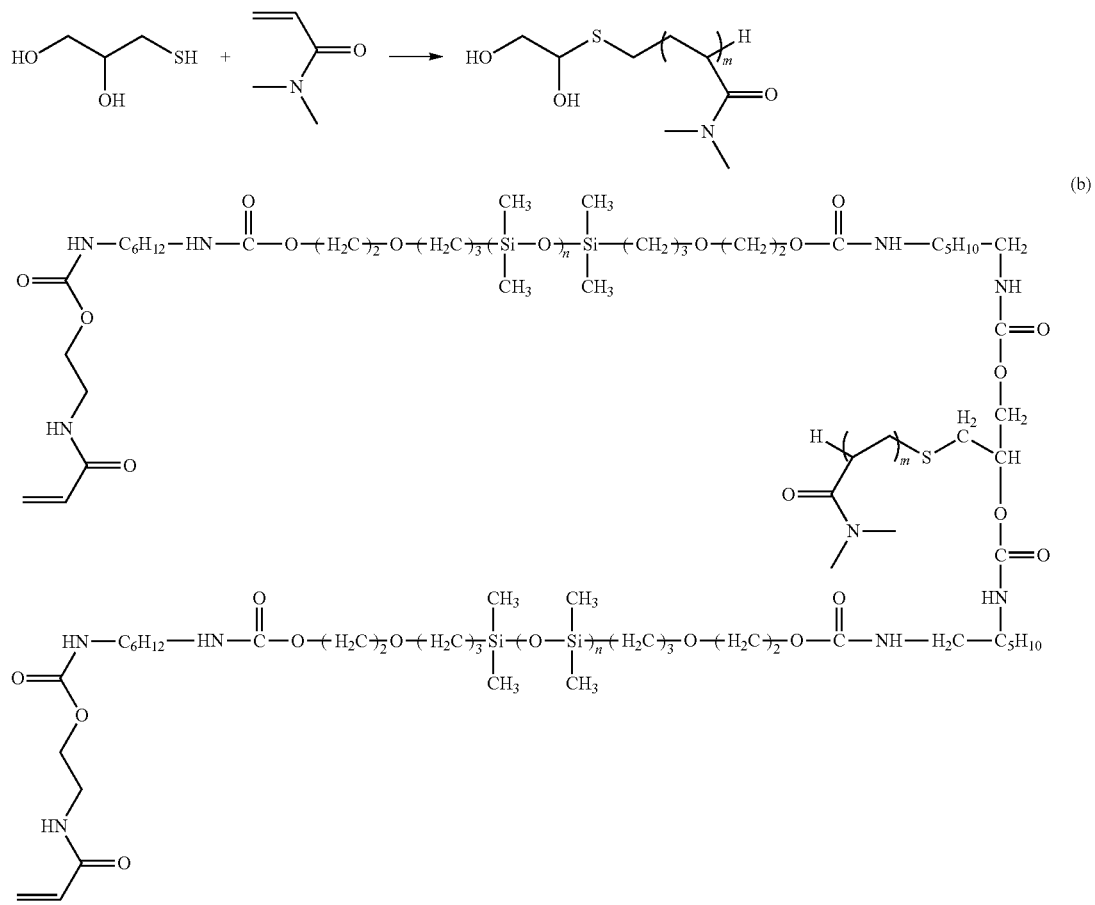

FIG. 1. Schematic illustration of preparation of pDMA-pDMS macromer: (a) dihydroxy Pdma; (b) pDMA-DMS macromere, containing multiple segments of pDMA and pDMS)... macromermacromer, containing multiple segments of pDMA and pDMS)...

Experiment 4

Purification of Macromer

After synthesis, the above solution from A-3 was concentrated to 30 g using rotavap at 30° C. It was then diluted with 400 mL of 1-propanol and filtered through 1 um glass microfiber filter. The solvent exchange from 1-propanol to water was achieved via azeotropic distillation. The final concentration of the solution is adjusted to around 5% before it was then ultra-filtered using 3k MW cutoff cassette. 50 L of de-ionized water was used for this ultrafiltration. The collected filtrate was freeze-dried.

Experiment 5

Macromer Stock Solution Preparation and Formulation a. 17.4 g macromer was weighed into a 60 mL jar, followed by addition of 9.37 g of DPGME. The solution was speed-mixed at 3,500 rpm till it became homogeneous.

b. A target amount of stock formulation was mixed with a target amount of 6% Irgacure 2959 solution in DPGME and additional DPGME to make a formulation with 55% solid and 0.3% Irgacure 2959. The solution was mixed at 3,500 rpm for 5 mins and transferred into syringes for lens fabrication.

Experiment 6

Preparation of Mold Releasing Agent

The following formulations (Tables 1 and 2) were generated by weighing the appropriate amount of additive into 500 mL bottles, then filling to Total Weight with water:

TABLE 1

| Mold releasing agent | g | Total Weight |
|---|---|---|
| LPEG-2000 Lipoid, Inc. | 1.2 g | 120 g |
| Urea Aldrich U5128 | 5 | 500 |
| Stearyl Amine Aldrich, 74750 | 5 | 500 |
| Tromethane | 5 | 500 |

TABLE 1-continued

| Mold releasing agent | g | Total Weight |
|---|---|---|
| Aldrich, T1503 Poly(allylamine) Aldrich, 479136 | 1.5 | 150 |
| Jeffamine-500 Huntsman Chemical | 5 | 500 |
| YAD-122 (Gelest Inc) | 0.15 | 960 Solubility limit; hazy suspension |
| YBD-125 (Gelest Inc) | 0.3 | 500 Solubility limit; hazy suspension |

In addition to the above aqueous solutions, organic solutions were prepared in the same manner as:

TABLE 2

| Additive | g | Solvent | Total Weight |
|---|---|---|---|
| KF-6001 Shin-Etsu, Silicone Diol | 1 | DPGME | 100 |
| Stearyl Amine As above | 0.1 | DPGME | 100 |
| Hexane | 10 | None | 10 |
| Dipropylene Glycol Methyl Ether Aldrich 283282 | 10 | None | 10 |

Experiment 7

A reusuable mold, which consists of a male half (made of quartz) and a female half (made of N-B270 Soda Lime Glass) and is similar to those described in U.S. Pat. No. 6,800,225, is used in the experiments.

The molding surfaces of the male and female mold halves are each covered with a solution containing a mold releasing agent as prepared in Experiment 6 using a transfer pipet (requires about 1 mL of solution to completely cover the mold surface). After the solution is applied it is removed using the same transfer pipet. This process is repeated for a total of 3 times. Subsequently, the molds are dried with air gun ($N_2$ stream at about 7 bars) to create a smooth, thin, homogeneous layer.

A lens formulation prepared in Example 5 is introduced into the cavity formed between the molding surfaces of the male and female mold halves. After curing, as described in Evaluation section, in order to measure the mold separation force, the female mold half of the mold is mounted rigidly onto the bottom of Zwick tensile test machine, the male mold half is attached to the machine with a cardanic suspension device to enable force-free alignment. The mold is opened at a speed of about 50 mm/min and mold separation force is measured. The molded lens is rinsed and loosened with DI water. The loosened lens is removed from the mold which is then cleaned with DI water and dried with $N_2$.

The quality of molded lenses is inspected under a 13-times magnification Optispec Shadowgraph. Detailed description of all lens defects were collected, and lens quality was summarized using % WR. The WR lenses were inspected with CLOQA (Contact Lens Optical Quality Assesment), a custom-made Foucault knife-edge microscope. The results are reported in Table 3.

TABLE 3

| Mold-Priming Agent | Chemical Structure | MSF Average (N) | % WR of total lenses |
|---|---|---|---|
| Control-1 (none) | N/A | 207 | 7% |
| Control-2 (none) | N/A | 201 | 0% |
| DPGME | HO–CH(CH3)CH2–O–CH2CH(CH3)–O–CH2CH(CH3)– (structure) | 115 | 80% |
| Jeff-500 1% | $H_2N$–CH(CH3)–(O–CH2CH(CH3))$_x$–(O–CH2CH(CH3))$_y$–(O–CH2CH(CH3))$_z$–$NH_2$ (structure) | 162 | 30% |
| LPEG-2000 1% | (diacylglycerophosphoethanolamine-PEG structure with $NH_4^+$ counterion and $(OCH_2CH_2)_{28}OCH_3$) | 135 | 70% |
| ODA in DPGME | $CH_3(CH_2)_{17}NH_2$ | 191 | 0% |
| PAH 1% | (branched polyamine structure with multiple $H_2N$ groups) | 167 | 20% |

TABLE 3-continued

| Mold-Priming Agent | Chemical Structure | MSF Average (N) | % WR of total lenses |
|---|---|---|---|
| Silicone oil in DPGME | HO-CH₂-CH₂-NH-C(=O)-O-CH₂-CH₂-O-CH₂-CH₂-CH₂-[Si(CH₃)₂-O]₈-Si(CH₃)₂-CH₂-CH₂-CH₂-O-CH₂-CH₂-OH | 154 | 20% |
| Stearyl amine HCl 1% | CH₃(CH2)₁₇NH₂ • HCl | 76 | 100% |
| Tromethane 1% | (HO-CH₂)₃C-NH₂ (tris(hydroxymethyl)aminomethane) | 133 | 40% |
| Urea 1% | H₂N-C(=O)-NH₂ | 116 | 80% |
| YAD-122 saturated | H₃C-Si(CH₃)₂-O-[Si(CH₃)₂-O]-[Si(CH₃)(R)-O]-Si(CH₃)₃ where R = -CH₂CH₂CH₂-N(pyrrolidone-3-C(=O)NH-CH₂CH₂CH₂-N(CH₃)₂) | 83 | 100% |
| YBD-125 saturated | H₃C-Si(CH₃)₂-O-Si(CH₃)₂-O-Si(CH₃)(R)-O-Si(CH₃)₃ where R = -CH₂CH₂CH₂-N(pyrrolidone-3-COOH) | 21 | 100% |

What is claimed is:

1. A method for making contact lenses, comprising the steps of:
   (1) providing a contact lens mold, wherein the mold has a first mold half with a first molding surface defining the anterior surface of a contact lens and a second mold half with a second molding surface defining the posterior surface of the contact lens, wherein said first and second mold halves are configured to receive each other such that a cavity is formed between said first and second molding surfaces;
   (2) applying a layer solution of mold releasing agent selected from the group consisting of fatty amines of carbon chain length C18 or less and silicones bearing pendant substituted pyrrolidone groups onto the first molding surface and/or the second molding surface, wherein the weight percentage of mold releasing agent in the solution is from 0.01% to 10% based on the entire weight of the solution;
   (3) at least partially drying said layer solution to form a coat of releasing agent on the first and/or second molding surface, wherein the formation of the coat of releasing agent vesicles on the first and/or second molding surfaces is characterized by having a percentage of reduction in mold separation force of at least about 50% relative to a control mold without any coat of the releasing agent vesicles thereon, (4) introducing a fluid composition into the cavity formed by the first and second molding surfaces with the coat of the mold releasing agent formed in step (3) thereon, wherein the fluid composition comprises a lens-forming material, wherein the lens-forming material is crosslinkable and/or polymerizable by actinic radiation, wherein the lens-forming material comprises at least one member selected from the group consisting of a hydrophilic vinylic monomer, a silicone containing vinylic monomer, a silicone-containing crosslinker, a silicone-containing prepolymer, a hydrophilic prepolymer free of silicone, and combinations thereof;

(5) crosslinking/polymerizing the lens-forming material in the mold to form a contact lens having a polymer matrix; and (6) separating the mold and removing the formed contact lens from the mold.

2. The method of claim 1, wherein the mold is a reusable mold.

3. The method of claim 2, wherein the reusable mold is made of glass or quartz.

4. The method of claim 1, wherein the mold releasing agent is a fatty amine of carbon chain length no greater than C18.

5. The method of claim 4, wherein the mold releasing agent is a stearyl amine.

6. The method of claim 1, wherein the mold releasing agent is a silicones bearing pendant substituted pyrrolidone groups.

7. The method of claim 6, wherein silicones bearing pendant substituted pyrrolidone groups is a (N-PYRROLIDONEPROPYL)METHYLSILOXANE-DIMETHYLSILOXANE COPOLYMER as shown by the formula 1:

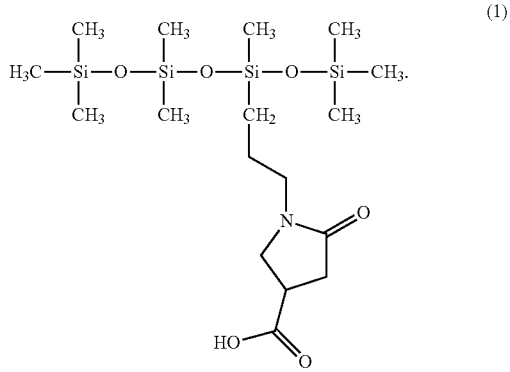 [SMILES: C[Si](C)(C)O[Si](C)(C)O[Si](C)(CCCN1CC(C(=O)O)CC1=O)O[Si](C)(C)C]

(1)

8. The method of claim 6, wherein silicones bearing pendant substituted pyrrolidone groups is a [(4-N,N-DIMETHYLAMIDO)-1-PYRROLYDINOPROPYL]METHYLSILOXANE)-(DIMETHYLSILOXANE) COPOLYMER as shown by the formula 2:

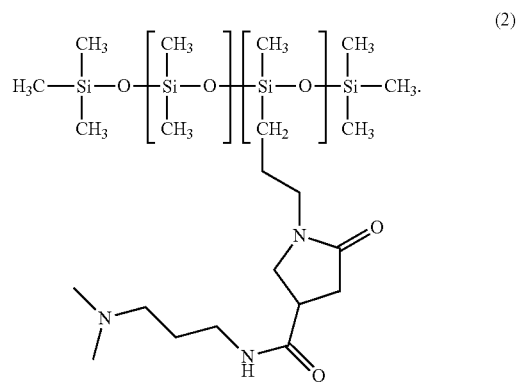

(2)

9. The method of claim 6, wherein the solution of mold releasing agent is a water solution.

10. The method of claim 1, wherein the step of applying a layer solution of mold releasing agent is carried by spraying the mold releasing agent solution onto the molding surfaces of the mold.

11. A method for producing a contact lens, comprising: the steps of:

(1) introducing a fluid composition into a mold for making a contact lens, wherein the fluid composition comprises a lens-forming material and a mold releasing agent selected from the group consisting of a fatty amine of carbon chain length C18 or less and a silicones bearing pendant substituted pyrrolidone groups, wherein the lens-forming material is crosslinkable and/or polymerizable by actinic radiation or by heating, wherein the lens-forming material comprises at least one member selected from the group consisting of a hydrophilic vinylic monomer, a silicone containing vinylic monomer, a silicone-containing crosslinker, a silicone-containing prepolymer, a hydrophilic prepolymer free of silicone, and combinations thereof;

(2) crosslinking/polymerizing the lens-forming material in the mold to form a lens having a polymer matrix, wherein at least part of the mold releasing agent migrates to the interface between the mold and the polymer matrix of the formed lens; and (3) separating the mold, wherein the mold releasing agent is present in an amount sufficient to reduce an averaged mold separation force by at least about 50% in comparison with that without the releasing agent.

12. The method of claim 11, wherein the mold is a reusable mold.

13. The method of claim 12, wherein the reusable mold is made of glass or quartz.

14. The method of claim 11, wherein the mold releasing agent is a fatty amine of carbon chain length no greater than C18.

15. The method of claim 14, wherein the mold releasing agent is a stearyl amine.

16. The method of claim 11, wherein the mold releasing agent is a silicones bearing pendant substituted pyrrolidone groups.

17. The method of claim 16, wherein silicones bearing pendant substituted pyrrolidone groups is a (N-PYRROLIDONEPROPYL) METHYLSILOXANE-DIMETHYLSILOXANE COPOLYMER as shown by the formula 1:

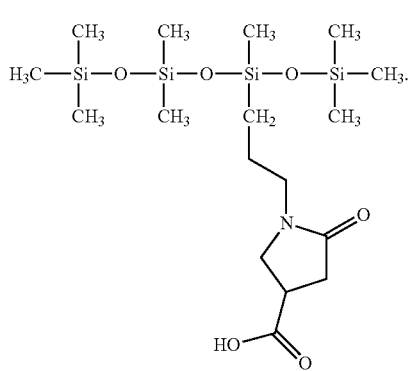

(1)

18. The method of claim 16, wherein silicones bearing pendant substituted pyrrolidone groups is a [(4-N,N-DIMETHYLAMIDO)-1-PYRROLYDINOPROPYL]METHYLSILOXANE)-(DIMETHYLSILOXANE) COPOLYMER as shown by the formula 2:

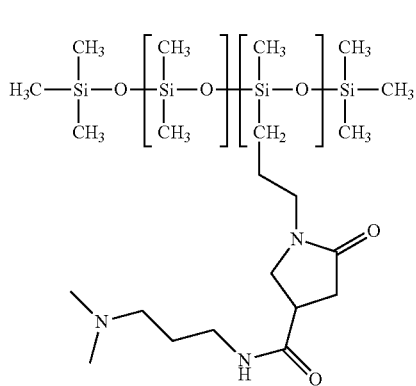

(2)

* * * * *